(12) United States Patent
Chopra et al.

(10) Patent No.: US 11,565,462 B2
(45) Date of Patent: Jan. 31, 2023

(54) THERMAL MARKING OF 3D PRINTED OBJECTS

(71) Applicant: Xerox Corporation, Norwalk, CT (US)

(72) Inventors: Naveen Chopra, Oakville (CA); Edward G. Zwartz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 71 days.

(21) Appl. No.: 17/014,672

(22) Filed: Sep. 8, 2020

(65) Prior Publication Data
US 2022/0072762 A1    Mar. 10, 2022

(51) Int. Cl.
| | |
|---|---|
| *B29C 64/118* | (2017.01) |
| *B33Y 50/02* | (2015.01) |
| *B29C 64/393* | (2017.01) |
| *B33Y 70/10* | (2020.01) |
| *B41M 5/34* | (2006.01) |

(52) U.S. Cl.
CPC .......... *B29C 64/118* (2017.08); *B29C 64/393* (2017.08); *B33Y 50/02* (2014.12); *B33Y 70/10* (2020.01); *B41M 5/34* (2013.01); *B29K 2995/0021* (2013.01)

(58) Field of Classification Search
None
See application file for complete search history.

(56) References Cited

U.S. PATENT DOCUMENTS

| | | | |
|---|---|---|---|
| 9,404,200 B2 * | 8/2016 | Steiner | B33Y 70/00 |
| 2008/0012926 A1 * | 1/2008 | Hara | G03G 15/5062 |
| | | | 347/158 |
| 2011/0224074 A1 * | 9/2011 | Okada | B41M 5/42 |
| | | | 503/208 |
| 2011/0253783 A1 * | 10/2011 | Baque | G06K 19/14 |
| | | | 235/435 |
| 2013/0292881 A1 * | 11/2013 | Steiner | B41M 5/34 |
| | | | 264/401 |
| 2016/0079178 A1 * | 3/2016 | Kim | H01L 21/4853 |
| | | | 257/773 |
| 2016/0311184 A1 * | 10/2016 | Gourraud | B29C 64/40 |
| 2016/0375638 A1 * | 12/2016 | Kabili | B29C 64/386 |
| | | | 264/492 |
| 2018/0239251 A1 | 8/2018 | Lee et al. | |
| 2018/0272749 A1 * | 9/2018 | Yamamoto | G06F 3/1259 |
| 2018/0293592 A1 | 10/2018 | Gold et al. | |
| 2018/0311892 A1 | 11/2018 | Abbott, Jr. et al. | |

(Continued)

FOREIGN PATENT DOCUMENTS

| | | |
|---|---|---|
| EP | 3928997 A1 * | 12/2021 |
| JP | 2013208845 A * | 10/2013 |

(Continued)

OTHER PUBLICATIONS

Extended European Search Report for Application No. 21192683.7, dated Jan. 19, 2022, 11 pages.

*Primary Examiner* — Chun Cao
*Assistant Examiner* — Michael Tang

(57) ABSTRACT

A method for marking a printed object is disclosed. For example, the method includes printing a three-dimensional (3D) object via a fused filament fabrication (FFF) printer, receiving a desired color marking to be marked on a surface of the 3D object, and controlling a point energy source to emit energy on a thermal treatment layer of the 3D object in accordance with the desired color marking.

20 Claims, 5 Drawing Sheets

(56) References Cited

U.S. PATENT DOCUMENTS

2019/0143582 A1* 5/2019 Hungerland ......... C08G 64/085
                                                      528/196
2020/0078137 A1* 3/2020 Chen ........................ A61C 7/08

FOREIGN PATENT DOCUMENTS

| JP | 2014136311 A | * | 7/2014 | |
|---|---|---|---|---|
| KR | 20200019275 A | * | 2/2020 | ........... B29C 64/118 |
| WO | WO-2005000592 A1 | * | 1/2005 | ............. B33Y 30/00 |

* cited by examiner

THERMAL MARKING OF 3D PRINTED OBJECTS

The present disclosure relates generally to three-dimensional (3D) printed objects and relates more particularly to a method to thermally mark a 3D printed object.

BACKGROUND

Three-dimensional printers can be used to print 3D objects. The 3D printers can be used to print a variety of different types of objects using different types of materials. Different types of processes can be used for 3D printing, such as extrusion, fusion of powders, and UV-curing of inkjet printed materials, for example. 3D printing represents an alternative additive approach for printing a 3D object layer-by-layer, as opposed to a subtractive process where a block of material is machined/etched/chiseled to furnish the final object.

One type of additive 3D printing process may be fused deposition modeling (FDM), also known as fused filament fabrication (FFF). The FDM process may extrude a partially melted material that is dispensed in a layer onto a platform. The extruded material may be dispensed in a shape or pattern that is desired for each layer. The process may be repeated to print a three-dimensional object.

SUMMARY

According to aspects illustrated herein, there is provided a method, non-transitory computer readable medium, and an apparatus for marking a printed object. One disclosed feature of the embodiments is a method that prints a three-dimensional (3D) object via a fused filament fabrication (FFF) printer, receives a desired color marking to be marked on a surface of the 3D object, and controls a point energy source to emit energy on a thermal treatment layer of the 3D object in accordance with the desired color marking.

Another disclosed feature of the embodiments is a non-transitory computer-readable medium having stored thereon a plurality of instructions, the plurality of instructions including instructions which, when executed by a processor, cause the processor to perform operations that print a three-dimensional (3D) object via a fused filament fabrication (FFF) printer, receive a desired color marking to be marked on a surface of the 3D object, and control a point energy source to emit energy on a thermal treatment layer of the 3D object in accordance with the desired color marking.

Another disclosed feature of the embodiments is an apparatus comprising a processor and a computer readable medium storing a plurality of instructions which, when executed by the processor, cause the processor to perform operations that print a three-dimensional (3D) object via a fused filament fabrication (FFF) printer, receive a desired color marking to be marked on a surface of the 3D object, and control a point energy source to emit energy on a thermal treatment layer of the 3D object in accordance with the desired color marking.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to thermally mark three-dimensional (3D) printed objects. As discussed above, various types of 3D printers can be used to print 3D objects. In some instances, it may be desirable to add writing, an image, or any other type of marking to a 3D object. Previous methods may not provide a sufficient resolution or may use methods that may not be compatible with fused deposition modeling (FDM) or fused filament fabrication (FFF) 3D printing methods.

For example, using different colored filaments and designing the 3D object with the different colored filaments can be complicated, expensive, and time consuming. In other examples, some methods may simply paint the desired color markings onto the 3D printed object. However, the paint may not be very durable and/or may have low resolution.

The present disclosure provides a method that can color text, images, or any other type of marking on a 3D object printed with FDM or FFF printers. The method may use a thermal treatment layer that can be thermally marked with an energy source. The energy source may be a point energy source that can provide high accuracy and resolution when applied to the thermal treatment layer to mark the printed object.

In one embodiment, the thermal treatment layer may be an additive that is part of the filament material that is extruded. However, the additive may react at a temperature that is higher than the melting/extrusion temperature of the filament material. As a result, the additive may not change color during the extrusion. Rather, the color of the additive may be selectively changed via a separate marking process with the point energy source.

The color change may be a chemical change to the physical properties of portions of the thermal treatment layer that are exposed to energy emitted by an energy source. The change may be caused by exposure to the energy. Thus, the color change may be more durable and more permanent than painting the marking onto the 3D object.

In one embodiment, the thermal treatment layer may be added as a coating after the 3D object is printed. Then, the point energy source may be applied to the coating at desired locations or patterns to create a marking. Thus, the present disclosure provides a process to provide high resolution coloring of a 3D printed object via thermal marking.

Figure 1:
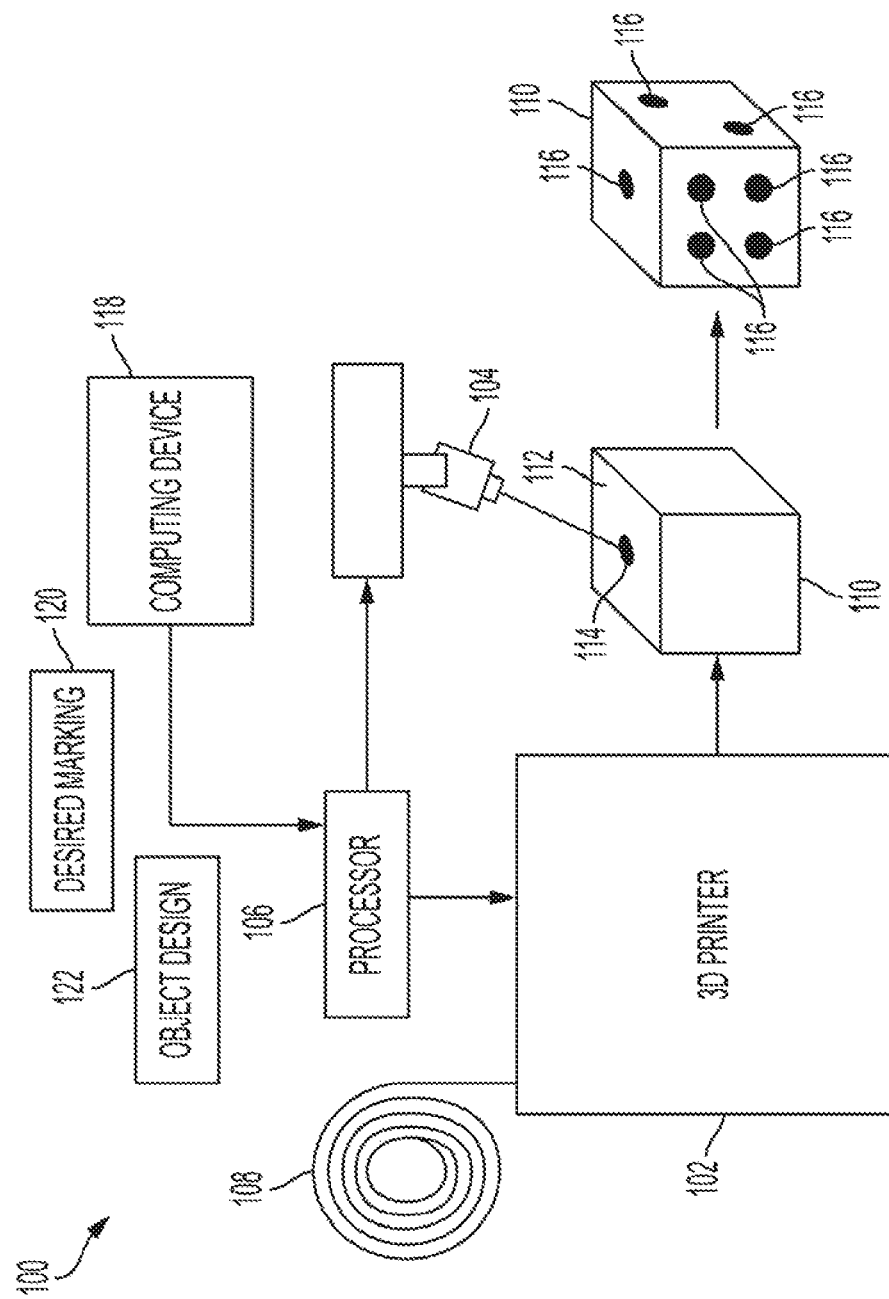
FIG. 1 illustrates a block diagram of a system of the present disclosure.

FIG. 1 illustrates an example system 100 of the present disclosure. In one embodiment, the system 100 may include a 3D printer 102, a point energy source 104, and a processor 106. Although the 3D printer 102, the point energy source 104, and the processor 106 are illustrated as separate components, it should be noted that the 3D printer 102, the point energy source 104, and the processor 106 may be part of a single apparatus within a common housing.

In one embodiment, the processor 106 may be communicatively coupled to the 3D printer 102 and the point energy source 104. The processor 106 may control operation of the 3D printer 102 and the point energy source 104.

In one embodiment, the system 100 may include a computing device 118. The computing device 118 may be a computer that can create a design for a 3D printed object 110 via computer aided drawing (CAD) programs. The computing device 118 may also create a desired marking 120 via the CAD programs.

In one embodiment, a desired marking 120 and an object design 122 may be generated by the computing device 118 and transmitted to the processor 106. The object design 122 may be in a format that can be used by the 3D printer 102 (e.g., a .dxf file, .stl files, and the like). The desired marking 120 may include an image, text, a combination of an image and text, and the like, that can be marked on the object 110 that is printed.

The processor 106 may control the 3D printer 102 to print the object 110 in accordance with the object design 122. In one embodiment, the 3D printer 102 may be a fused deposition modeling (FDM) or a fused filament fabrication (FFF) printer. It should be noted that the 3D printer 102 has been simplified for ease of explanation and may include additional components that are not shown (e.g., a heat source for fusing, a printhead to dispense a filament material 108, a movable platform, and the like).

A FFF printer may extrude the filament material 108 layer-by-layer onto a platform to print the object 110. The filament material 108 may be fed through a printhead that heats the filament material 108 to melt or nearly melt the filament material 108. The printhead may then dispense the melted filament material 108 in accordance with the object design 122.

After the object 110 is printed, the point energy source 104 may emit an energy source onto a location 114 on a surface 112 of the object 110. The processor 106 may control the point energy source 104 to emit energy in accordance with the desired marking 120.

In one embodiment, the point energy source 104 may be an energy source that can emit energy in a well-defined narrow beam of energy. For example, the point energy source 104 may be a laser. In one embodiment, the laser may be powered at a power level with a sufficient energy density to raise a temperature of the surface 112 of the object 110 enough make the desired marking 120. The power level may be a function of a scanning speed. For example, at a slower scanning speed, lower energy levels can be used. At a higher scanning speed, a higher energy level can be used. In one embodiment, the laser may be a carbon dioxide laser that can emit energy between 5 Watts (W) to 50 W of energy.

Since the temperature generated by the amount of energy emitted by the point energy source 104 is higher than the extrusion temperature of the filament material 108, the point energy source 104 may emit energy for short bursts or a short amount of time (e.g., a few seconds) to mark the surface 112 of the object 110. The short bursts or short amount of time may prevent the point energy source 104 from deforming, damaging, or melting the surface 112 of the object 110. In one embodiment, the point energy source 104 may make several passes over the location 114 on the surface 112 using the short bursts or a short amount of time to thermally mark the location 114.

In one embodiment, the point energy source 104 may emit an energy source onto a location 114 on a surface 112 of the object 110 shortly after the filament material 108 is deposited. For example, after a layer of the filament material 108 is deposited, the filament material 108 may still be hot. Thus, a lower powered point energy source 104 may be used to color a location 114 of the surface 112 of the object 110. In other words, some energy savings may be realized in using a lower powered energy source immediately after depositing the filament material 108 versus waiting until the entire object 110 is printed and cooled. In an example, the point energy source may be 1 W to 10 W of energy when used immediately after each layer of the filament material 108 is deposited.

In one embodiment, the point energy source 104 may emit different levels of energy. For example, the different levels of energy may correspond to different temperatures that can be used to thermally mark the object 110. As discussed in further details below, the object 110 may be thermally marked with different colors. The different colors may be created by applying different energy levels to convert or activate different additives on the surface 112 of the object 110.

In one embodiment, the object 110 may be rotated and/or moved to thermally mark different sides of the object 110. The point energy source 104 may then thermally mark the sides of the object 110 to create images 116 on the object 110.

In one embodiment, the surface 112 of the object 110 may include a thermal treatment layer. The thermal treatment layer may include additives that may react to a particular temperature to change colors or generate a desired color. In other words, the point energy source 104 may apply a localized amount of energy at the location 114 to color a portion of the thermal treatment layer via a physical change in the properties of the additive in the thermal treatment layer.

In one embodiment, the thermal treatment layer may include an additive that changes color at a particular temperature. The additive may include a leuco dye and an acid developer in a matrix. The leuco dye may include at least one of a crystal violet lactone, a triarylmethane, a sulfur dye, a vat dye, a fluoran dye, and the like. Examples of the acid developer may include diphenols, salicylic acid derivatives, octadecylphosphonic acid and the like. The matrix may further include metal salt activators and/or suppression agents. The metal salt activators may include a zinc salt of an aromatic carboxylic acid. The suppression agent may include 2-hydroxy-1-aminopropanol, butyl amine, and mixtures, thereof.

In another example, the additive may be an irreversible material. The irreversible material may include an irreversible inorganic thermochromic material. Examples of irreversible inorganic thermochromic materials may include copper (I) iodide, ammonium metava adate, manganese violet ($Mn(NH_4)_2P_2O_7$), and the like.

In one embodiment, different leuco dyes may be mixed together in the thermal treatment layer to create different colors. For example, different leuco dyes may change color at different temperatures. The point energy source 104 may emit energy at a first wattage to heat the thermal treatment layer to a first temperature to convert a first leuco dye into a first color. The point energy source 104 may then emit energy at a second wattage to heat the thermal treatment layer to a second temperature to convert a second leuco dye into a second color. The process may be repeated for any number of different lueco dyes that can change at different temperatures within the thermal treatment layer.

Figure 2:
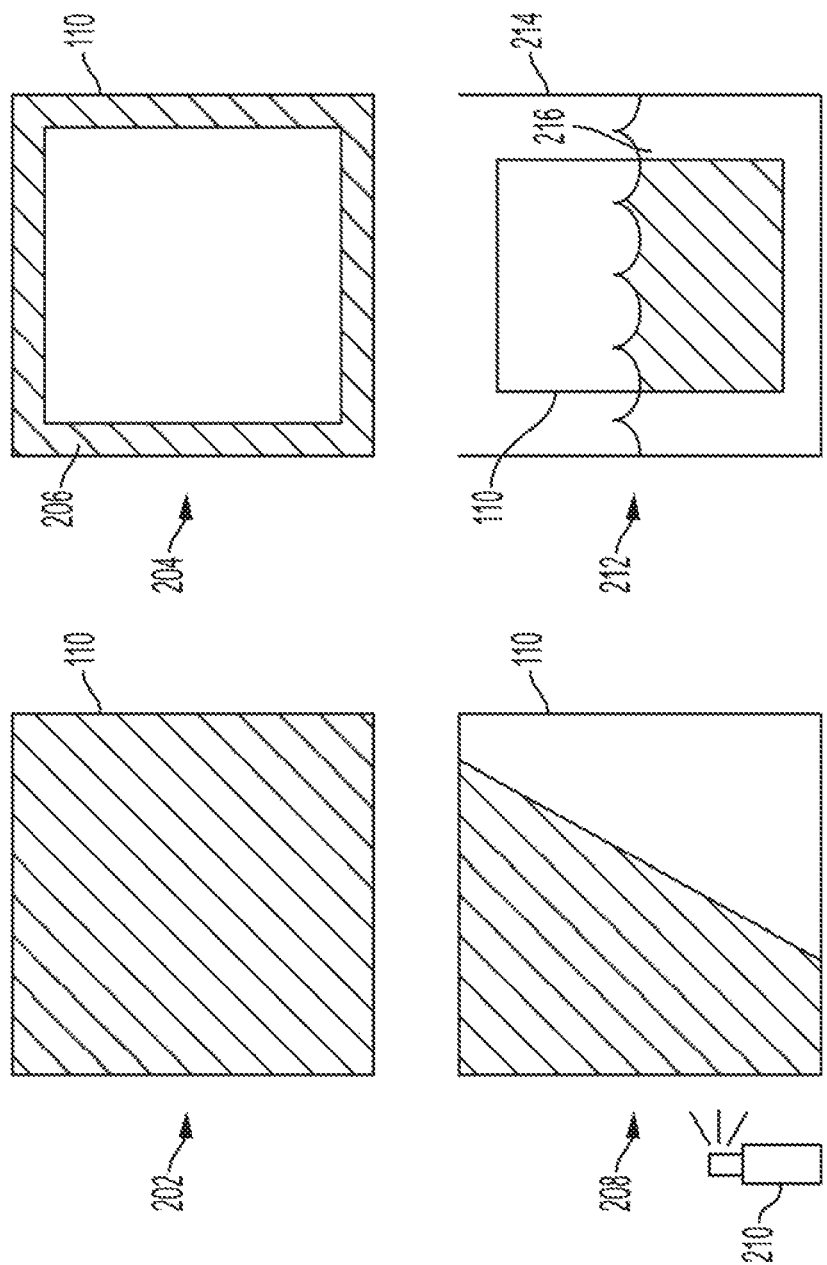
FIG. 2 illustrates a block diagram of different examples of how a thermal treatment layer can be included in a printed object of the present disclosure.

FIG. 2 illustrates block diagrams of different examples of how the thermal treatment layer can be included in the printed object 110 of the present disclosure. Example 202 illustrates a solid fill. For example, the thermal treatment layer may be mixed in with the filament material 108. The combination of the thermal treatment layer and the filament material 108 may be formed into a roll to be fed to the 3D printer 102 and extruded. The additive in the thermal treatment layer may change color at a temperature that is higher than an extrusion temperature of the filament material 108. As a result, the additive may not react to change color when exposed to the extrusion temperature that melts the filament material 108 during extrusion. The 3D printed object 110 may then contain the thermal treatment layer, which is mixed throughout the entire printed object 110.

Example 204 illustrates a printed shell 206. For example, the object 110 may be printed with the filament material 108. Then, a second filament material with the thermal treatment layer can be extruded by the 3D printer 102 to form the printed shell 206 around the object 110. In one embodiment, the 3D printer 102 may switch between the filament material 108 and the filament material mixed with the thermal treatment layer to print the outer shell 206 with the inner portion layer-by-layer.

Example 208 illustrates a spray coating. For example, the thermal treatment layer can be stored in a spray can 210 or dispenser. After the object 110 is printed by the 3D printer 102, the thermal treatment layer can be spray coated onto the object 110 with the spray can 210. The thermal treatment layer can be coated on desired portions of the object 110 or over the entire outer surface of the object 110.

The thermal treatment layer may be allowed to dry on the object 110. After the thermal treatment layer is dried, the point energy source 104 may thermally mark the thermal treatment layer to mark the object 110 with the images 116.

Example 212 illustrates a dip coating. For example, a thermal treatment layer 216 can be stored in a container 214. After the object 110 is printed by the 3D printer 102, the object 110 may be dipped into the thermal treatment layer 216. Desired portions of the object 110 may be dipped or the entire object 110 may be submerged in the thermal treatment layer 216 to coat the entire outer surface of the object 110.

The thermal treatment layer 216 may be allowed to dry on the object 110. After the thermal treatment layer 216 is dried, the point energy source 104 may thermally mark the thermal treatment layer 216 to mark the object 110 with the images 116.

Figure 3:
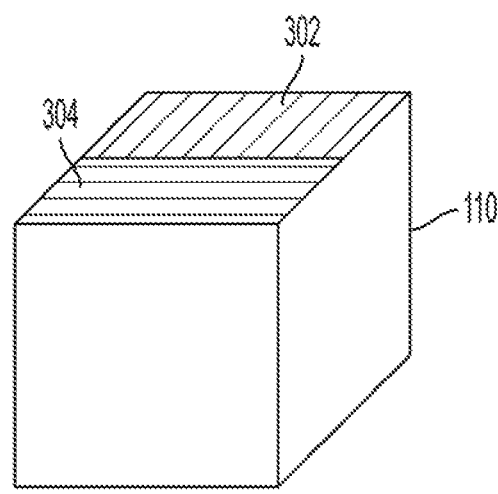
FIG. 3 illustrates an example of marking the printed object with multiple colors of the present disclosure.

FIG. 3 illustrates an example of marking the printed object 110 with multiple colors of the present disclosure. FIG. 3 illustrates an example with two different colors. As noted above, different additives with different color change temperatures can be used to mark the object 110 with different colors.

In one embodiment, the object 110 may be marked with two different colors 302 and 304. For example, the thermal treatment layer may include a first additive or leuco dye that changes color at a first temperature and a second additive or leuco dye that changes color at a second temperature. The first additive and the second additive can be mixed together in the thermal treatment layer or may be applied as separate thermal treatment layers to different portions of the object 110.

The first additive may correspond to the color 302 and the second additive may correspond to the color 304. In one embodiment, the point energy source 104 may emit energy at a first energy level onto the surface of the object 110. The first energy level may heat the surface of the object 110 to a first temperature that causes the first additive to change to the color 302.

After the desired portions of the surface of the object are marked with the first color 302, the point energy source 104 may emit energy at a second energy level onto the surface of the object 110. The second energy level may heat the surface of the object 110 to a second temperature that causes the second additive to change to the second color 304. For example, any two temperatures above the extrusion temperature of the filament material 108 may be used (e.g., temperatures above 160 degrees Celsius (° C.)). For example, a first temperature of 250° C. can be used to change the first color 302 and a temperature of 400° C. can be used to change the second color 304. Other example temperatures may also be used. For materials with higher melting temperatures, higher temperatures can be used for changing the colors 302 and 304.

Although two different colors 302 and 304 are illustrated by example in FIG. 3, it should be noted that any number of different colors can be generated. The number of different colors may correspond to the number different additives having different non-overlapping temperatures to activate a color change in the respective additives that are included in the thermal treatment layer.

Figure 4:
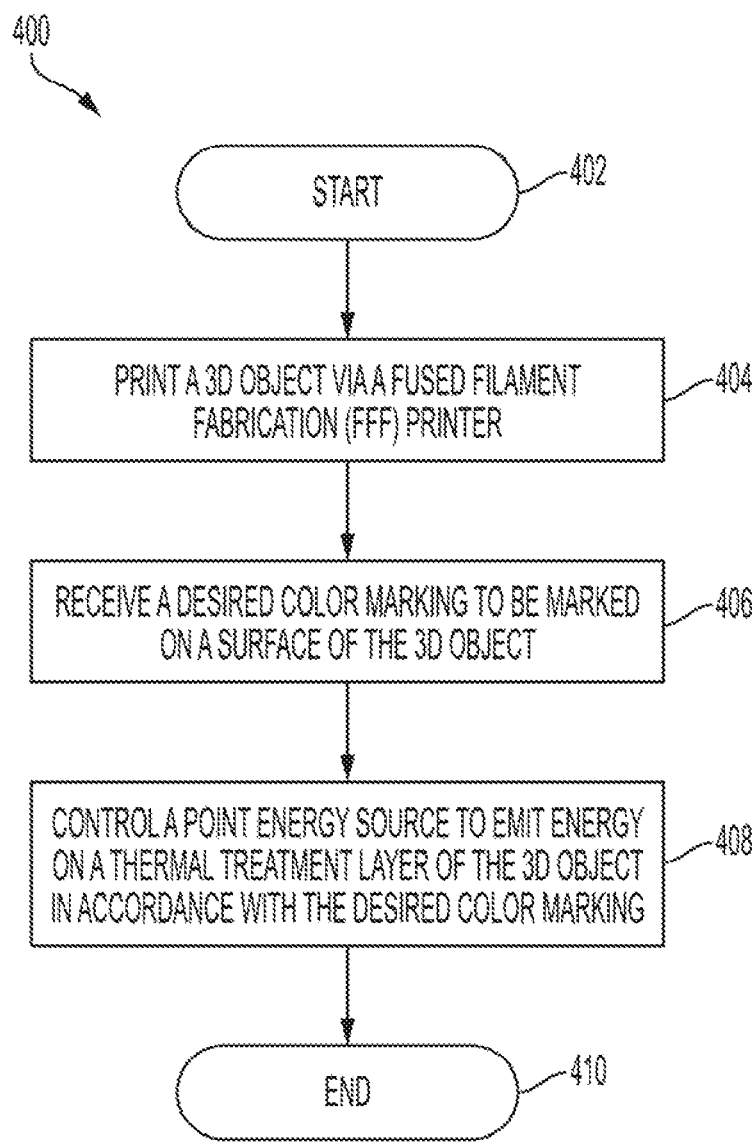
FIG. 4 illustrates a flowchart of an example method for marking a printed object of the present disclosure.
Figure 5:
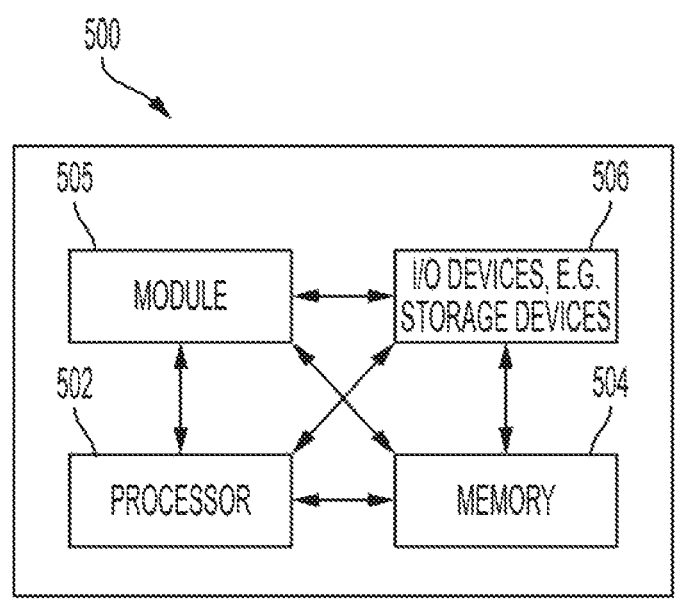
FIG. 5 illustrates a high-level block diagram of an example computer suitable for use in performing the functions described herein.

FIG. 4 illustrates a flowchart of an example method 400 for marking a printed object of the present disclosure. In one embodiment, one or more blocks of the method 400 may be performed by the system 100, or a computer/processor that controls operation of the system 100 as illustrated in FIG. 5 and discussed below.

At block 402, the method 400 begins. At block 404, the method 400 prints a three-dimensional (3D) object via a fused filament fabrication (FFF) printer. For example, the FFF printer or FDM printer may extrude a filament material layer-by-layer to print a 3D object. The object may be printed in accordance with an object design generated by a computing device in communication with the 3D printer.

At block 406, the method 400 receives a desired color marking to be marked on a surface of the 3D object. The color marking may be a design generated by the computing device. The desired color marking may be text, an image, a graphic, or any combination thereof.

At block 408, the method 400 controls a point energy source to emit energy on a thermal treatment layer of the 3D object in accordance with the desired color marking. In one embodiment, the thermal treatment layer may be mixed in with the filament material that is extruded. Thus, the filament material may be formed with the thermal treatment layer mixed throughout.

In one embodiment, the 3D object may be printed with an outer shell that includes the thermal treatment layer. For example, a filament material may be used to print the 3D object. Then the filament material mixed with the thermal treatment layer may be extruded to form the outer shell.

In one embodiment, the thermal treatment layer may be spray coated or dip coated onto the object. For example, the 3D object can be printed. After the 3D object is printed, the thermal treatment layer may be applied to the entire outer surface of the 3D object, or desired portions of the outer surface of the 3D object.

In one embodiment, the thermal treatment layer may include an additive that can change color when exposed to a particular temperature. The additive may include a leuco dye and an acid developer in a matrix. Examples of leuco dyes that can be used may include a crystal violet lactone, a triarylmethane, a sulfur dye, a vat dye, a fluoran dye, and the like.

In one embodiment, different additives can be mixed together to generate different colored markings on the 3D object. For example, different additives with different non-overlapping color change temperatures can be used to generate the different colored markings. The point energy source may apply a first energy level to heat the thermal treatment layer at a first temperature. One of the additives may react to the first temperature and change to a first color. The point energy source may apply a second energy level to heat the thermal treatment layer at a second temperature. Another one of the additives may react to the second temperature and change to a second color.

Thus, the method 400 may provide an efficient non-contact method for thermally marking the 3D printed object to create color markings on the surface of the 3D printed object. Thus, using direct coloration with inks or paint or adding materials can be avoided with the embodiments of the present disclosure. At block 410, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for marking a printed object, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for marking a printed object (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for marking a printed object (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   printing a three-dimensional (3D) object via a fused filament fabrication (FFF) printer with a filament material;
   receiving a desired color marking to be marked on a surface of the 3D object; and
   controlling a point energy source to emit energy on a thermal treatment layer on the surface of the 3D object in accordance with the desired color marking after the filament material is deposited to build the 3D object, wherein the thermal treatment layer comprises a leuco dye and an acid developer matrix that changes color at a temperature that is higher than an extrusion temperature of the filament material extruded by the FFF printer, wherein the point energy source is controlled to emit energy on the thermal treatment layer via a plurality of passes using bursts of energy across a location on the thermal treatment layer receiving the energy.

2. The method of claim 1, wherein the thermal treatment layer of the 3D object is formed via an additive that is mixed with the filament material that is extruded by the FFF printer to print the 3D object.

3. The method of claim 2, wherein the thermal treatment layer is printed as an outer shell of the 3D object.

4. The method of claim 1, wherein the thermal treatment layer is applied as a coating after the 3D object is printed.

5. The method of claim 4, wherein the thermal treatment layer is applied via a dipping process or a spray coating process.

6. The method of claim 1, wherein the leuco dye comprises at least one of: a crystal violet lactone, a triarylmethane, a sulfur dye, a vat dye, or a fluoran dye.

7. The method of claim 1, wherein the desired color marking comprises a plurality of colors.

8. The method of claim 7, wherein the thermal treatment layer comprises different additives, wherein each one of the different additives changes color at a different temperature to generate the plurality of colors in the thermal treatment layer.

9. The method of claim 1, wherein the point energy source comprises a laser that emits between 5 Watts to 50 Watts of energy.

10. The method of claim 1, wherein the acid developer matrix further comprises a metal salt activator and a suppression agent.

11. The method of claim 10, wherein the metal salt activator comprises a zinc salt of an aromatic carboxylic acid.

12. The method of claim 10, wherein the suppression agent comprises one or more of: 2-hydroxy-1-aminopropanol or butyl amine.

13. The method of claim 1, wherein the acid developer matrix comprises at least one of: a dipheonol, a salicylic acid derivative, or octadecylphosphonic acid.

14. A non-transitory computer-readable medium storing a plurality of instructions, which when executed by a processor, cause the processor to perform operations, the operations comprising:

> printing a three-dimensional (3D) object via a fused filament fabrication (FFF) printer with a filament material;
>
> receiving a desired color marking to be marked on a surface of the 3D object; and
>
> controlling a point energy source to emit energy on a thermal treatment layer on the surface of the 3D object in accordance with the desired color marking after the filament material is deposited to build the 3D object, wherein the thermal treatment layer comprises a leuco dye and an acid developer matrix that changes color at a temperature that is higher than an extrusion temperature of the filament material extruded by the FFF printer, wherein the point energy source is controlled to emit energy on the thermal treatment layer via a plurality of passes using bursts of energy across a location on the thermal treatment layer receiving the energy.

15. The non-transitory computer-readable medium of claim 14, wherein the thermal treatment layer of the 3D object is formed via an additive that is mixed with the filament material that is extruded by the FFF printer to print the 3D object.

16. The non-transitory computer-readable medium of claim 14, wherein the thermal treatment layer is applied as a coating after the 3D object is printed.

17. The non-transitory computer-readable medium of claim 14, wherein the leuco dye comprises at least one of: a crystal violet lactone, a triarylmethane, a sulfur dye, a vat dye, or a fluoran dye.

18. The non-transitory computer-readable medium of claim 14, wherein the desired color marking comprises a plurality of colors.

19. The non-transitory computer-readable medium of claim 14, wherein the thermal treatment layer comprises different additives, wherein each one of the different additives changes color at a different temperature to generate the plurality of colors in the thermal treatment layer.

20. A method, comprising:

> printing a three-dimensional (3D) object via a fused filament fabrication (FFF) printer that extrudes a filament material layer-by-layer to print the 3D object;
>
> receiving a desired color marking to be marked on a surface of the 3D object;
>
> coating the 3D object with a thermal treatment layer comprising a leuco dye and an acid developer in a matrix that changes color at a temperature that is higher than an extrusion temperature of the filament material extruded by the FFF printer, wherein portions of the thermal treatment layer exposed to a predefined temperature change color;
>
> drying the thermal treatment layer; and
>
> controlling a laser to emit energy on the thermal treatment layer of the 3D object in accordance with the desired color marking, wherein the laser is controlled to emit energy on the thermal treatment layer via a plurality of passes using bursts of energy across a location on the thermal treatment layer receiving the energy.

* * * * *